US008086186B2

(12) United States Patent
Choi et al.

(10) Patent No.: US 8,086,186 B2
(45) Date of Patent: Dec. 27, 2011

(54) COGNITIVE RADIO COMMUNICATION APPARATUS AND METHOD WHICH ADAPTABLY CONTROLS SENSING REFERENCE LEVEL

(75) Inventors: Hyun Ho Choi, Suwon-si (KR); Tae In Hyon, Hwaseong-si (KR); Kyung Hun Jang, Suwon-si (KR); In Sun Lee, Seongnam-si (KR); Youngsoo Kim, Seoul (KR)

(73) Assignees: Samsung Electronics Co., Ltd., Suwon-si (KR); Samsung Electro-Mechanics Co., Ltd., Suwon-si (KR)

( * ) Notice: Subject to any disclaimer, the term of this patent is extended or adjusted under 35 U.S.C. 154(b) by 841 days.

(21) Appl. No.: 12/168,216

(22) Filed: Jul. 7, 2008

(65) Prior Publication Data

US 2009/0170545 A1    Jul. 2, 2009

(30) Foreign Application Priority Data

Jan. 2, 2008    (KR) .................. 10-2008-0000430

(51) Int. Cl.
*H04B 17/00* (2006.01)
(52) U.S. Cl. .................. 455/67.11; 455/67.13; 455/522; 455/114.2; 370/329
(58) Field of Classification Search ............... 455/67.11, 455/67.13, 522, 114.2, 63.1, 278.1, 296, 455/501, 135, 226.3; 370/329, 426, 310
See application file for complete search history.

(56) References Cited

U.S. PATENT DOCUMENTS

| | | | | |
|---|---|---|---|---|
| 4,901,307 | A * | 2/1990 | Gilhousen et al. | 370/320 |
| 5,557,638 | A | 9/1996 | Fisher et al. | |
| 6,297,624 | B1 * | 10/2001 | Mitsui et al. | 323/316 |
| 6,574,334 | B1 | 6/2003 | Bartkowiak | |
| 2006/0226949 | A1 | 10/2006 | Reene | |
| 2007/0100922 | A1 | 5/2007 | Ashish | |
| 2008/0317062 | A1 * | 12/2008 | Timmers et al. | 370/462 |
| 2009/0042510 | A1 * | 2/2009 | Lee et al. | 455/39 |
| 2009/0174383 | A1 * | 7/2009 | Tsui et al. | 323/282 |
| 2009/0179698 | A1 * | 7/2009 | Ichitsubo et al. | 330/133 |
| 2009/0252048 | A1 * | 10/2009 | Liang et al. | 370/252 |
| 2009/0279626 | A1 * | 11/2009 | Wang | 375/260 |
| 2009/0298439 | A1 * | 12/2009 | Choi et al. | 455/67.11 |
| 2009/0304096 | A1 * | 12/2009 | Khattab et al. | 375/260 |
| 2009/0304110 | A1 * | 12/2009 | Choi et al. | 375/299 |
| 2010/0061315 | A1 * | 3/2010 | Cordeiro | 370/329 |
| 2010/0086010 | A1 * | 4/2010 | Choi et al. | 375/132 |
| 2010/0093360 | A1 * | 4/2010 | Choi et al. | 455/450 |
| 2010/0135226 | A1 * | 6/2010 | Chandramouli et al. | 370/329 |
| 2010/0271948 | A1 * | 10/2010 | Challapali et al. | 370/235 |
| 2010/0273536 | A1 * | 10/2010 | Shaffer et al. | 455/573 |
| 2011/0090853 | A1 * | 4/2011 | Chandramouli et al. | 370/329 |

FOREIGN PATENT DOCUMENTS

WO    WO 2005/067240 A1    7/2005

* cited by examiner

*Primary Examiner* — Minh D Dao
(74) *Attorney, Agent, or Firm* — NSIP Law

(57) ABSTRACT

A cognitive radio communication apparatus and method which adaptably controls a sensing reference level based on a transmission power of a transmitter is provided. A cognitive radio communication apparatus includes a sensing reference level control unit to adaptably control a sensing reference level based on a transmission power of a secondary transmitter included in a secondary network, and a fast sensing unit to determine whether a signal received for a predetermined time period exists based on the controlled sensing reference level.

23 Claims, 9 Drawing Sheets

COGNITIVE RADIO COMMUNICATION APPARATUS AND METHOD WHICH ADAPTABLY CONTROLS SENSING REFERENCE LEVEL

CROSS-REFERENCE TO RELATED APPLICATION

This application claims the benefit under 35 U.S.C. §119(a) of a Korean Patent Application No. 2008-0000430, filed in the Korean Intellectual Property Office on Jan. 2, 2008, the entire disclosure of which is incorporated herein by reference.

TECHNICAL FIELD

The following description relates to a technology for controlling a sensing reference level based on a transmission power of a transmitter included in a secondary network.

BACKGROUND

With the development of a variety of communication services and portability of communication apparatuses, researches on a cognitive radio technology have been conducted to efficiently use wireless resources.

Generally, in a cognitive radio technology, secondary communication apparatuses of a secondary network cognitively select whole or a part of wireless resources assigned to primary communication apparatuses of a primary network, and use the selected wireless resources.

However, although secondary communication apparatuses communicate using cognitively-selected wireless resources, the secondary communication apparatuses should not interfere with communication operations of primary communication apparatuses. That is, it may be desirable to limit or eliminate interference that occurs in primary communication apparatuses due to secondary communication apparatuses.

Secondary communication apparatuses may need to accurately sense whether primary communication apparatuses perform communication operations, to prevent the secondary communication apparatuses from interfering with the communication operations of primary communication apparatuses. Currently, research is being conducted regarding determining whether the secondary system is performing the communication operation. One scheme, in particular, that sequentially performs a fast sensing operation and a fine sensing operation, is receiving much attention.

According to the above scheme, the secondary system may quickly determine whether a signal received during a fast sensing section exists. The fast sensing section may be a relatively short time period. The secondary system may compare power of the received signal with a predetermined sensing level to thereby quickly determine whether the received signal exists. When it is determined the signal received during the fast sensing section exists, the secondary system may specifically determine whether a signal received during a fine sensing section is transmitted from the primary system. The fine sensing section may be a relatively long time period. The secondary system may specifically determine whether the received signal is transmitted from the primary system using a matched filter and the like.

When a secondary communication apparatus determines that a received signal exists even though a received signal does not exist, a fine sensing may be unnecessarily performed. Also, where a secondary communication apparatus determines that a signal received for a fast time period does not exist even though a received signal exists, the secondary communication apparatus may not perform a fine sensing. Accordingly, a communication operation of a primary communication apparatus is prevented due to the secondary communication apparatus.

Accordingly, there is a need for a technology that may reduce wasting of wireless resources due to an unnecessary fine sensing, and perform a fast sensing more accurately.

SUMMARY

According to an aspect, a cognitive radio communication apparatus is provided. The cognitive radio communication apparatus includes a sensing reference level control unit to adaptably control a sensing reference level based on a transmission power of a secondary transmitter included in a secondary network, and a fast sensing unit to determine whether a signal received for a predetermined time period exists based on the controlled sensing reference level.

According to another aspect, a cognitive radio communication method is provided. The cognitive radio communication method includes adaptably controlling a sensing reference level based on a transmission power of a secondary transmitter included in a secondary network, and determining whether a received signal exists for a predetermined time period based on the controlled sensing reference level based on the controlled sensing reference level.

According to still another aspect, a cognitive radio communication apparatus for a cellular communication system is provided. The cognitive radio communication apparatus includes a sensing reference level control unit to adaptably control a sensing reference level based on a transmission power of a base station or terminal included in a secondary network corresponding to the cellular communication system, and a fast sensing unit to determine whether a signal received for a predetermined time period exists based on the controlled sensing reference level.

According to still another aspect, there is provided a cognitive radio communication apparatus and method that adapatably controls a sensing reference level based on a transmission power of a secondary transmitter, so as to simultaneously reduce a probability of a false alarm and probability of missed detection that may occur when a fast sensing is performed.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
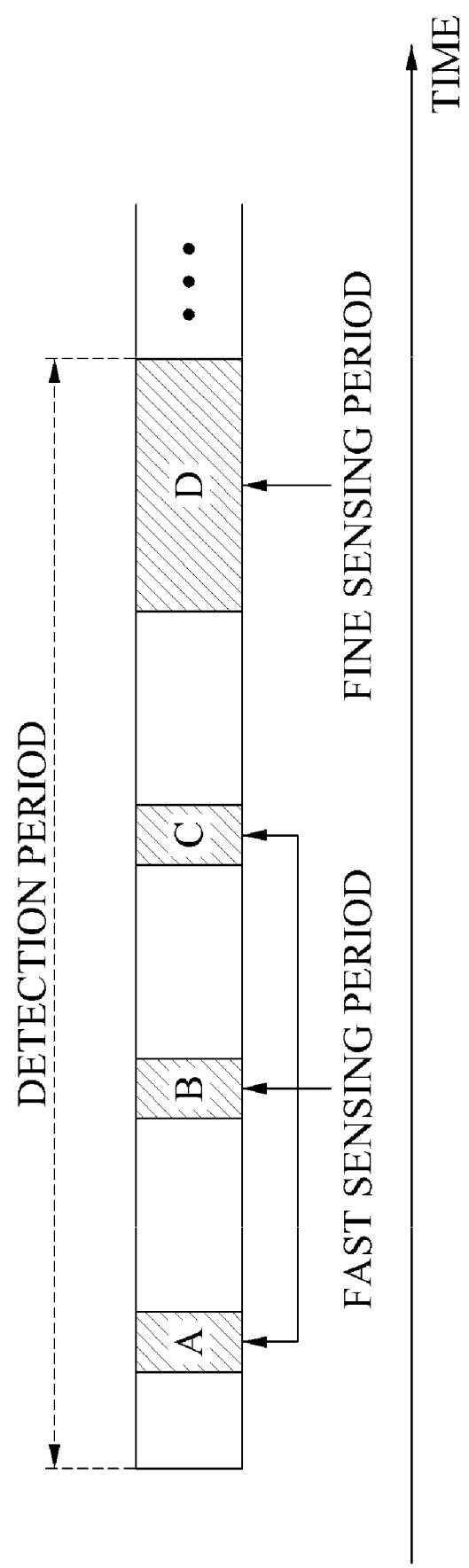
FIG. 1 is a diagram illustrating a fast sensing period and fine sensing period of a cognitive radio communication apparatus included in a secondary network according to an exemplary embodiment.

FIG. 1 illustrates a fast sensing period and fine sensing period of a cognitive radio communication apparatus included in a secondary network according to an exemplary embodiment.

Referring to FIG. 1, the cognitive radio communication apparatus determines whether a signal received during a detection period exists and whether the received signal is generated in a primary network. The detection period includes three fast sensing periods A, B, and C and a fine sensing period D.

A time length of each of the three fast sensing periods A, B, and C is relatively short. The cognitive radio communication apparatus quickly performs a fast sensing at every time interval. The time interval is relatively short. The cognitive radio communication apparatus determines whether a power of the received signal is greater than or equal to a predetermined sensing reference level during the three fast sensing periods A, B, and C, and whether the received signal exists.

For example, when the power of the received signal is greater than or equal to the sensing reference level, the cognitive radio communication apparatus may determine that the received signal exists. When the power of the received signal is less than the sensing reference level, the cognitive radio communication apparatus may determine that the received signal does not exist.

Accordingly, since the cognitive radio communication apparatus determines whether the received signal exists based on the power of the received signal, the cognitive radio communication apparatus may quickly determine that the received signal exists.

When it is determined that the signal received during the three fast sensing periods A, B, and C exists, the cognitive radio communication apparatus performs a fine sensing during the fine sensing period D. A time length of the fine sensing period D is relatively long, and the fine sensing is performed more fine than the fast sensing.

For example, the cognitive radio communication apparatus may ascertain whether a received signal is generated from a primary network using a matched filter, and the like, and identify a type of the primary network, and the like.

Accordingly, the cognitive radio communication apparatus included in the secondary network may determine whether the signal generated from the primary network exists through the two-step sensing operations, the fast sensing and fine sensing. Also, the cognitive radio communication apparatus may determine whether to continuously use wireless resource which is being currently used.

The fast sensing of the cognitive radio communication apparatus is further described below.

When the sensing reference level is set extremely high, the cognitive radio communication apparatus may determine that the received signal does not exists, even though the fine sensing is to be performed since the signal generated from the primary network actually exists. In this case, a communication operation of communication apparatuses included in the primary network cannot be appropriately performed due to a communication operation of the cognitive radio communication apparatus included in the secondary network.

Conversely, when the sensing reference level is set extremely low, the cognitive radio communication apparatus may erroneously determine that the received signal exists, even though the received signal does not exist. In this case, the cognitive radio communication apparatus may unnecessarily perform the fine sensing. In this instance, a time length of the fine sensing period is relatively long, and wireless resources may be unnecessarily wasted due to the fine sensing.

Accordingly, according to an aspect, the cognitive radio communication apparatus performs the fast sensing based on the set sensing reference level.

Figure 2:
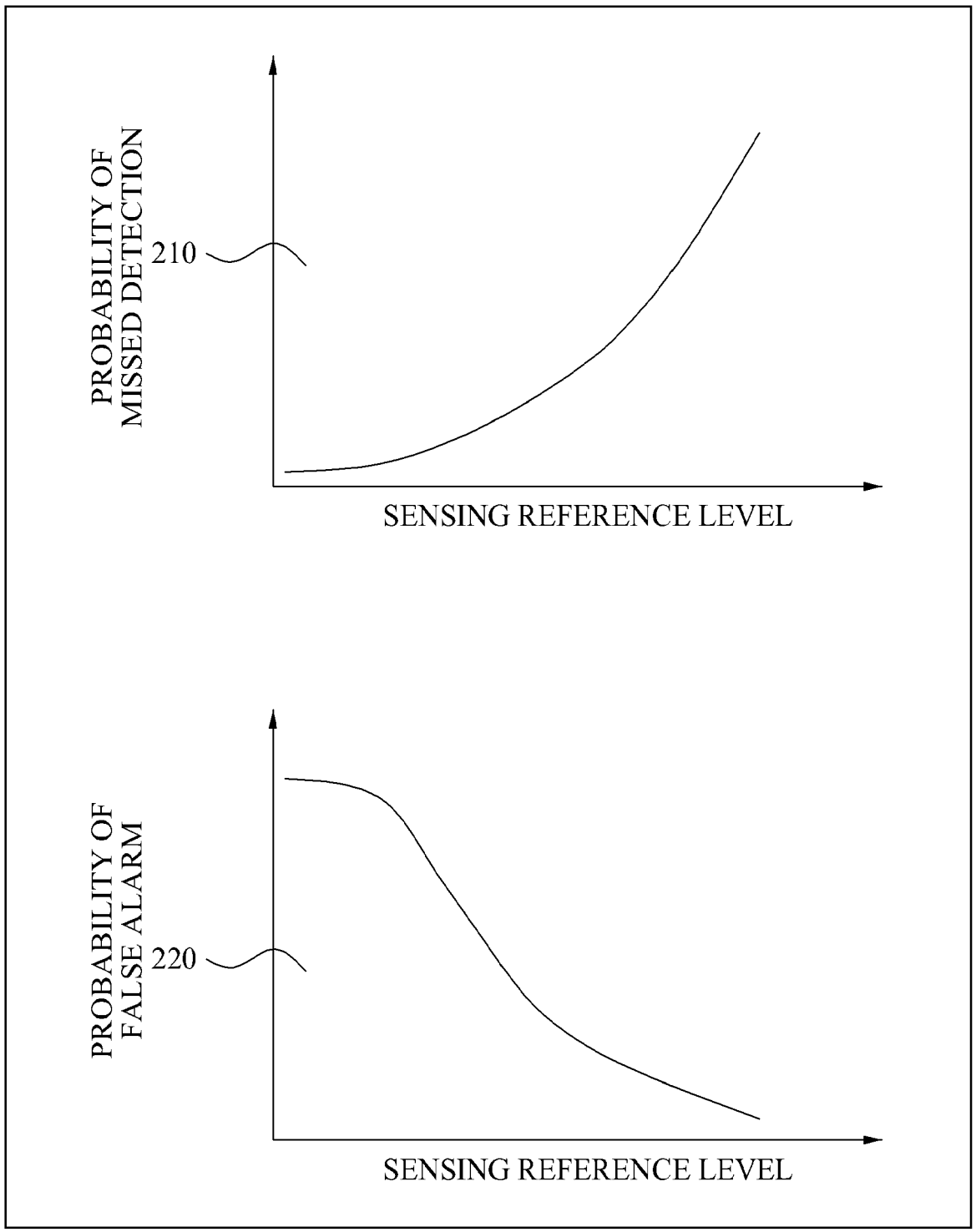
FIG. 2 is a graph illustrating an example of a probability of missed detection and probability of false alarm with respect to a sensing reference level.

FIG. 2 illustrates an example of a probability of missed detection and probability of false alarm with respect to a sensing reference level.

Referring to FIG. 2, a curve 210 indicates a change of the probability of missed detection with respect to a change of the sensing reference level. The probability of missed detection indicates a probability that a cognitive radio communication apparatus erroneously determines a received signal does not exist, even though the received signal exists.

Through the curve 210, it may be ascertained that the probability of missed detection increases as the sensing reference level increases. When the sensing reference level is extremely high, the probability that the cognitive radio communication apparatus may determine the received signal does not exist may increase, even though the received signal exists.

A curve 220 indicates a change of the probability of a false alarm according to the change of the sensing reference level. The probability of a false alarm indicates a probability that the cognitive radio communication apparatus erroneously determines the received signal exists, even though the received signal does not exist.

Through the curve 220, it may be ascertained that the probability of a false alarm increases as the sensing reference level decreases. When the sensing reference level is extremely low, the probability that the cognitive radio communication apparatus may determine the received signal exists increases, even though the received signal does not exist. Accordingly, the fine sensing that wastes wireless resources may be often performed.

Figure 3:
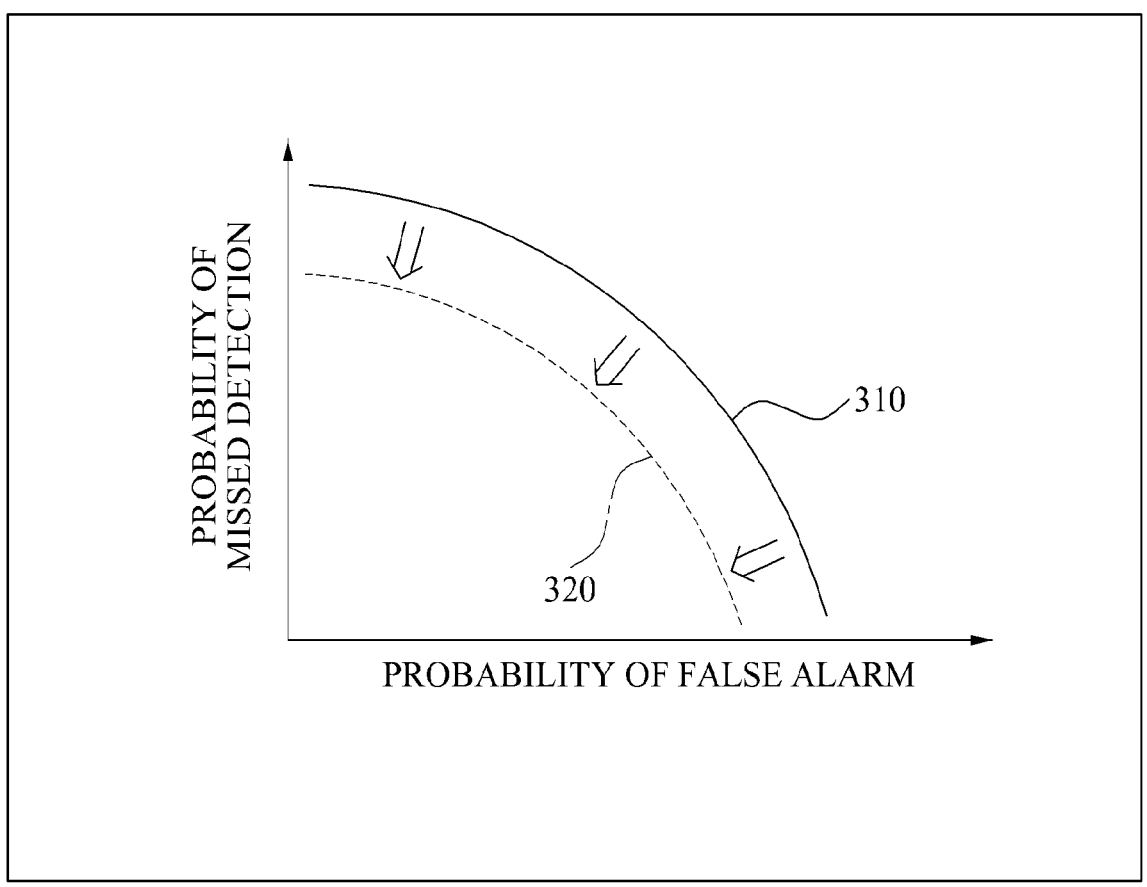
FIG. 3 is a graph illustrating an example of a probability of missed detection with respect to a probability of false alarm.

FIG. 3 illustrates an example of a probability of missed detection with respect to a probability of a false alarm.

Referring to FIG. 3, a curve 310 and curve 320 indicate a change of the probability of missed detection with respect to a change of the probability of false alarm. Through the curve 310 and curve 320, it may be ascertained that a relationship between the probability of false alarm and the probability of missed detection is a trade-off relationship.

However, according to an aspect, the curve 310 should be changed to the curve 320 by appropriately setting a sensing reference level. Specifically, the probability of a false alarm and the probability of missed detection may be reduced through the setting of the sensing reference level.

Figure 4:
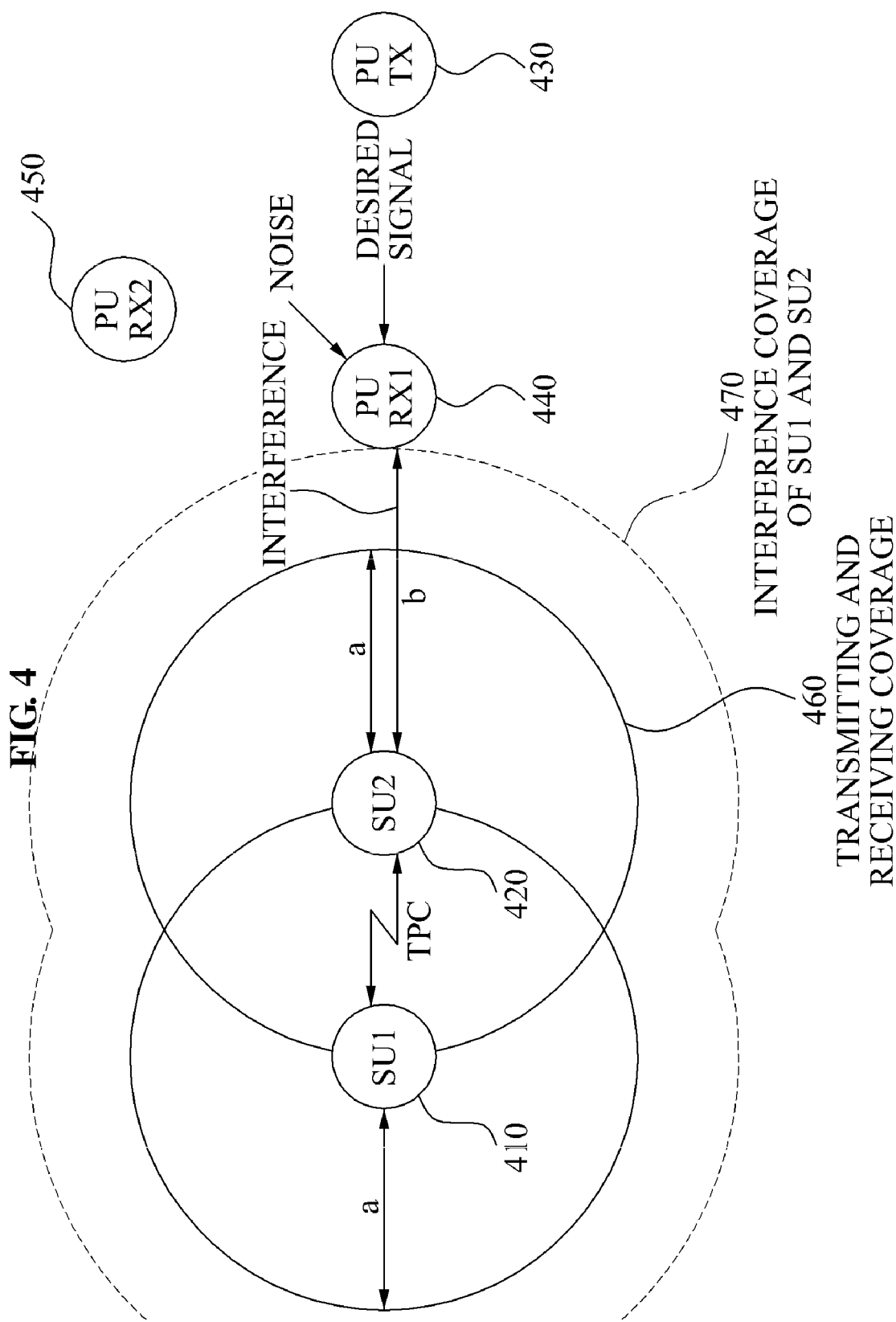
FIG. 4 is a diagram illustrating a secondary network and primary network according to an exemplary embodiment.

FIG. 4 illustrates an example of a secondary network and primary network according to an exemplary embodiment.

Referring to FIG. 4, the secondary network includes a first secondary user communication apparatus SU1 410 and second secondary user communication apparatus SU2 420. Also, the primary network includes a primary user transmitter PU TX 430 and primary user receivers PU RX1 440 and PU RX2 450.

Each of SU1 410 and SU2 420 controls a transmission power based on a distance between SU1 410 and SU2 420. As the distance between SU1 410 and SU2 420 increases, the transmission power may increase. As the distance between SU1 410 and SU2 420 decreases, the transmission power may decrease.

Each of SU1 410 and SU2 420 transmits/receives data based on the controlled transmission power. Each of SU1 410 and SU2 420 has a transmitting and receiving coverage 460 which is a range that the data is appropriately transmitted/received based on the transmission power. Also, each of SU1 410 and SU2 420 has an interference coverage 470 which is a range that an interference may affect other communication apparatuses based on the transmission power. A radius of the transmitting and receiving coverage 460 is 'a' and a radius of the interference coverage 470 is 'b'.

When the transmission power of each of SU1 410 and SU2 420 increases, the radius b of the interference coverage 470 increases. Accordingly, SU1 410 and SU2 420 should sensitively perform a fast sensing. Each of SU1 410 and SU2 420 should reduce the sensing reference level to perform the fast sensing.

Conversely, when the transmission power of each of SU1 410 and SU2 420 decreases, the radius b of the interference coverage 470 decreases. Accordingly, SU1 410 and SU2 420 may perform the fast sensing less sensitively than when the radius b of the interference coverage 470 increases.

Accordingly, the sensing reference level is associated with the transmission power of each of SU1 410 and SU2 420. Each of SU1 410 and SU2 420 adaptably controls the sensing reference level based on the transmission power, and thus the probability of a missed detection and probability of a false alarm that occurs when the fast sensing is performed may be simultaneously reduced.

Figure 5:
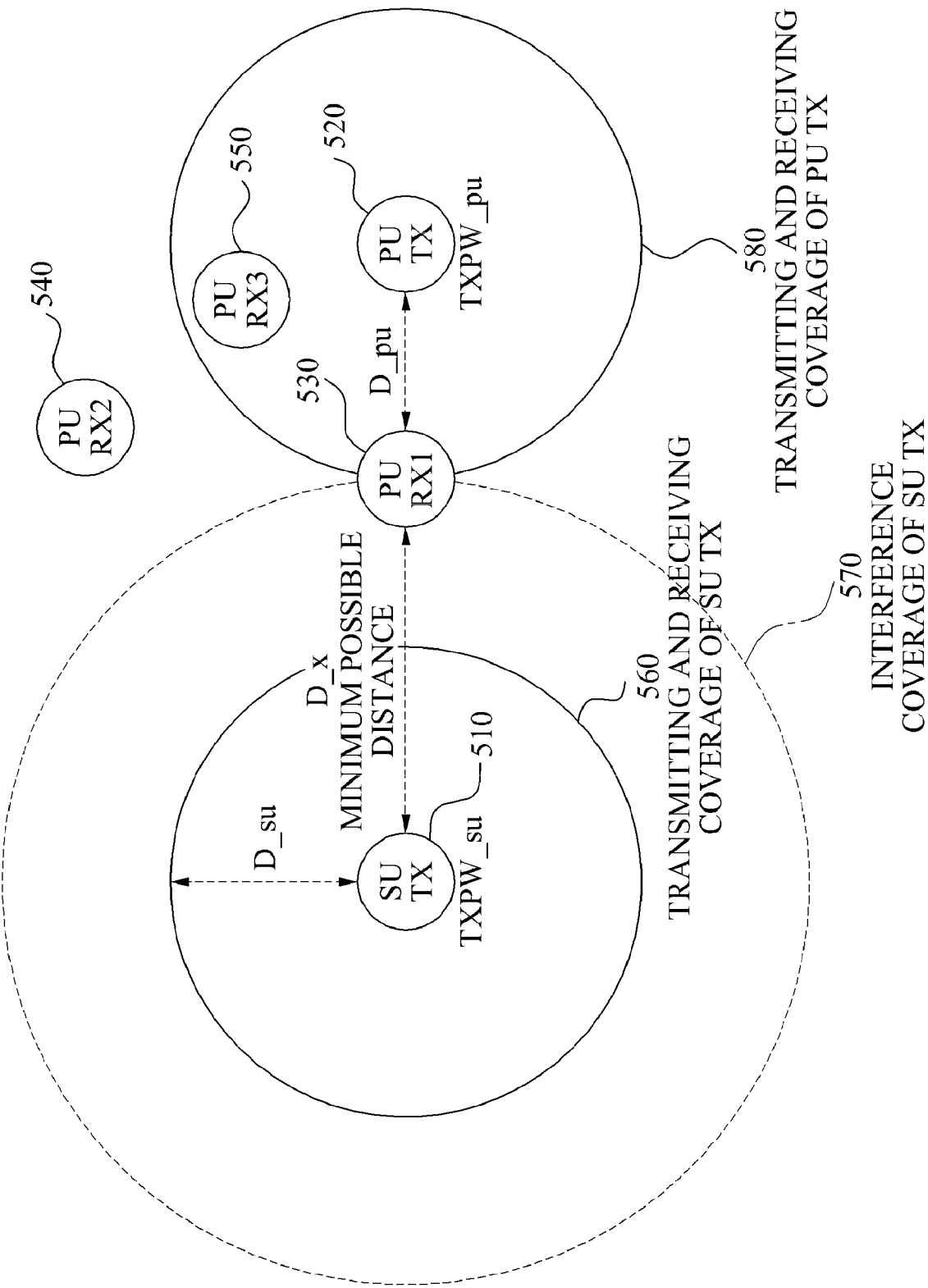
FIG. 5 is a diagram illustrating an example of a primary receiver which is a minimum possible distance away from a secondary transmitter.

FIG. 5 illustrates an example of a primary receiver which is a minimum possible distance away from a secondary transmitter.

Referring to FIG. 5, a secondary network includes a secondary user transmitter SU TX 510, and a primary network includes a primary user transmitter PU TX 520, primary user receivers PU RX1 530, PU RX2 540, and PU RX3 550. In FIG. 5, PU TX 520, PU RX1 530, PU RX2 540, and PU RX3 550 are conceptually illustrated. Since PU TX 520, PU RX1 530, PU RX2 540, and PU RX3 550 have a mobility, PU TX 520, PU RX1 530, PU RX2 540, and PU RX3 550 can be located anywhere in the primary network.

SU TX 510 has a transmitting and receiving coverage 560 which is a range where data may be transmitted/received. SU TX 510 has an interference coverage 570 based on a transmission power TXPW_su. Also, PU TX 520 has a transmitting and receiving coverage 580 where data may be transmitted/received. Since SU TX 510 ascertains the transmission power TXPW_su in advance, a radius D_su of the transmitting and receiving coverage 560 may be ascertained in advance.

SU TX 510 predicts an amount of interference which may occur in PU RX1 530, PU RX2 540, and PU RX3 550, and the sensing reference level may be controlled based on the predicted interference amount. SU TX 510 may control the sensing reference level to enable the amount of interference which may occur in PU RX1 530, PU RX2 540, and PU RX3 550 to be less than a predetermined threshold. For example, when the amount of interference which may occur in PU RX1 530, PU RX2 540, and PU RX3 550 is greater than or equal to the predetermined threshold, SU TX 510 may control the sensing reference level to enable PU RX1 530, PU RX2 540, and PU RX3 550 to be recognized during a fast sensing period.

The amount of interference which may occur in PU RX1 530, PU RX2 540, and PU RX3 550 is associated with a Signal to Interference and Noise Ratio (SINR) of PU RX1 530, PU RX2 540, and PU RX3 550.

Specifically, each of RX1 530, PU RX2 540, and PU RX3 550 has a minimum SINR which is a minimum value of a required SNIR. Each of PU RX1 530, PU RX2 540, and PU RX3 550 may appropriately perform a communication operation when an actual SINR is greater than or equal to the minimum SINR.

SU TX 510 may control the sensing reference level based on a minimum SINR of each of PU RX1 530, PU RX2 540, and PU RX3 550.

For example, when a current transmission power is maintained, SU TX 510 may predict a minimum possible distance D_X between SU TX 510 and PU RX1 530. The minimum possible distance D_X is a distance where an actual SINR of PU RX1 530 is identical to the minimum SINR. In this instance, PU RX1 530 does not actually exist, and is a virtually predicted primary user receiver which is the minimum possible distance D_X away from SU_TX 510.

Accordingly, the sensing reference level may be set to enable SU TX 510 to sense a primary user receiver located within the minimum possible distance D_X based on SU TX 510. Also, the sensing reference level may be set in order to enable SU TX 510 not to sense a primary user receiver located further than the minimum possible distance D_X from SU TX 510.

That is, since the sensing reference level is set to enable a signal to be sensed, the fast sensing may be performed more efficiently. The signal is transmitted from PU RX1 530 located at the minimum possible distance D_X. In this instance, PU RX1 530 does not actually exist, and is a primary user receiver virtually predicted by SU TX 510.

An actual SINR SINR_pu of PU RX1 530, located at the minimum possible distance D_X from SU TX 510, may be represented as Equation 1.

$$SINR\_pu = \frac{TXPW\_pu - f(D\_pu)}{PW\_noise + [TXPW\_su - (f(D\_X) - \alpha)] \times k} \quad \text{[Equation 1]}$$

(PW_noise: thermal noise power, TXPW_pu: transmission power of PU TX 520, f(D_X):loss power according to the minimum possible distance D_X, α:margin with respect to loss power, k: a number of communication apparatuses which can provide interference to PU RX1 530, D_X: minimum possible distance).

Here, f(d) may be a sum of 1) antennal transmission loss Loss_tx which occurs when an electric wave is emitted from an antenna, 2) path loss, and 3) miscellaneous losses. The antennal transmission loss Loss_tx may be represented as 20 log($4\pi/\lambda$).$\lambda$ denotes a wavelength of electric wave. Also, the path loss can be represented as 10n*log(d), and n denotes a pathloss exponent. Also, the path loss may be represented as L_Hata+u_excess*log(f/f0)+20 log(d). L_Hata denotes a parameter of Hata model, u_excess denotes a frequency dependent excess pathloss, f denotes an operating frequency, and f0 denotes a basic frequency. Also, the miscellaneous losses may be a sum of a fading margin, body loss, loss due to a partial mismatch, and the like.

SU TX 510 may calculate the minimum possible distance D_X using the actual SINR SINR_pu of PU RX1 530 and a minimum SINR SINR_pu_min required by PU RX1 530, which is represented as Equation 2.

$$SINR\_pu = SINR\_pu\_min \quad \text{[Equation 2]}$$

Accordingly, SU TX 510 may calculate the minimum possible distance D_X using Equation 2. Thus, the sensing reference level can be set to enable SU TX 510 to sense a primary user receiver located within the minimum possible distance D_X. Also, the sensing reference level may be set to enable SU TX 510 not to sense a primary user receiver located further than the minimum possible distance D_X.

Specifically, SU TX 510 may assume a case that PU RX1 530, located at the minimum possible distance D_X based on SU TX 510, transmits a signal, and a power RXPW_su of the signal received in SU TX 510 may be predicted as Equation 3.

$$RXPW\_su = TXPW\_pu - (f(D\_X + D\_pu) + \beta) \quad \text{[Equation 3]}$$

(RXPW_su:power of a signal received in SU TX 510, TXPW_pu:transmission power of PU TX 520, f(D_X+D_pu):loss power depending on distance D_X+D_pu, $\beta$:margin for loss power).

In Equation 3, when it is assumed that PU RX1 530, located at the minimum possible distance D_X based on SU TX 510, transmits a signal, SU TX 510 may predict the power RXPW_su of the signal received in SU TX 510.

Also, SU TX 510 may set the predicted power RXPW_su as the sensing reference level, and perform the fast sensing using the set sensing reference level. Accordingly, the fast sensing may be performed more efficiently.

For example, it is assumed that SU TX 510 sets the predicted power RXPW_su as the sensing reference level. In this instance, SU TX 510 may receive a signal transmitted from PU RX3 550. However, since a distance between SU TX 510 and PU RX3 550 is greater than or equal to the minimum possible distance D_X, the power of the signal received in SU TX 510 may be less than the predicted power RXPW_su which is set as the sensing reference level. Accordingly, SU TX 510 may determine the signal transmitted from PU RX3 550 during a fast sensing period does not exist. Also, since the distance between SU TX 510 and PU RX3 550 is greater than or equal to the minimum possible distance D_X, SU TX 510 and PU RX3 550 may exist together. Thus, a result of the determining through the fast sensing is appropriate.

Conversely, it is assumed that an A primary user receiver is located within the minimum possible distance D_X from SU TX 510. In this instance, SU TX 510 may receive a signal A from the A primary user receiver, and a power of the signal A received in SU TX 510 may be greater than or equal to the power RXPW_su. Accordingly, SU TX 510 may accurately determine that the signal received during the fast sensing period exists. The A primary user receiver and SU TX 510 are extremely adjacent to each other, and thereby cannot exist together. Thus, it is appropriate that SU TX 510 determines that the signal received during the fast sensing period exists.

According to an exemplary embodiment, SU TX 510 adaptably sets a sensing reference level based on a transmission power of SU TX 510, and thereby may perform the fast sensing more precisely. Specifically, SU TX 510 may predict the minimum possible distance D_X using a minimum SINR required by a primary user receiver. Also, SU TX 510 may determine the sensing reference level using the predicted minimum possible distance D_X.

Figure 6:
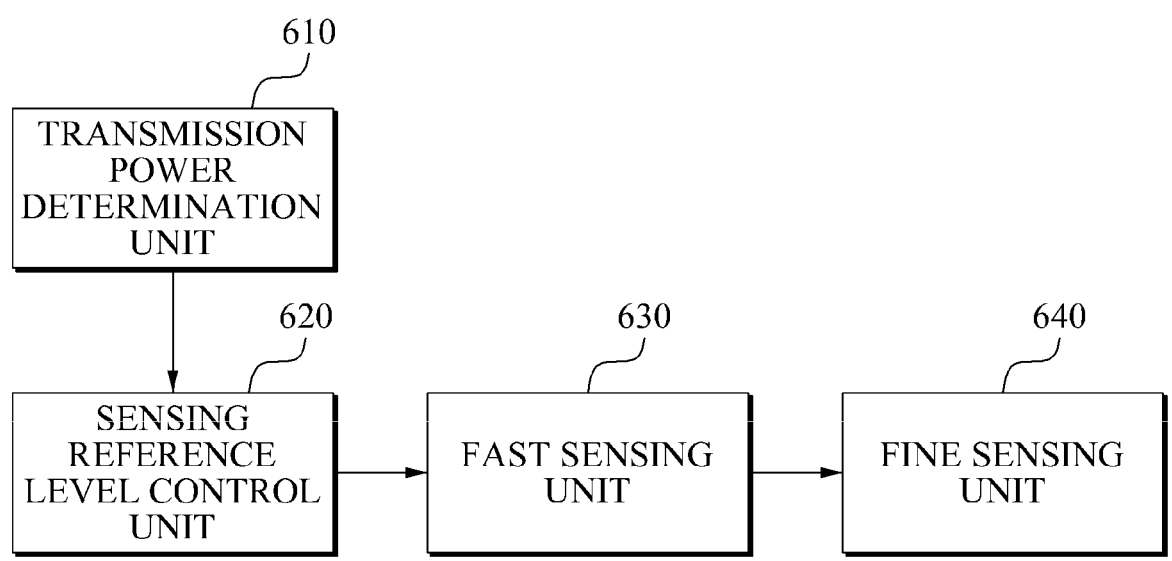
FIG. 6 is a block diagram illustrating a cognitive radio communication apparatus according to an exemplary embodiment.

FIG. 6 is a block diagram illustrating a cognitive radio communication apparatus according to an exemplary embodiment.

Referring to FIG. 6, the cognitive radio communication apparatus includes a transmission power determination unit 610, sensing reference level control unit 620, fast sensing unit 630, and fine sensing unit 640.

The transmission power determination unit 610 determines a transmission power of a secondary transmitter based on a distance between the secondary transmitter and secondary receiver included in a secondary network. The transmission power determination unit 610 may increase the transmission power of the secondary transmitter when the distance between the secondary transmitter and secondary receiver increases, and decrease the transmission power of the secondary transmitter when the distance between the secondary transmitter and secondary receiver decreases.

Also, the sensing reference level control unit 620 adaptably controls the sensing reference level based on the transmission power of the secondary transmitter. The sensing reference level control unit 620 may predict an amount of interference which may occur in a primary receiver included in a primary network. Also, the sensing reference level control unit 620 may control the sensing reference level based on the predicted interference amount.

Specifically, the sensing reference level control unit 620 may control the sensing reference level based on a minimum SINR required by the primary receiver included in the primary network. The sensing reference level control unit 620 may predict a minimum possible distance between the secondary transmitter and the primary receiver, and control the sensing reference level based on the predicted minimum possible distance. The minimum possible distance is a distance where an actual SINR of the primary receiver is identical to the minimum SINR.

The sensing reference level control unit 620 may control the sensing reference level based on a coverage radius of a primary transmitter and a previously identified power of a signal transmitted from the primary transmitter. The primary transmitter is included in the primary network.

The fast sensing unit 630 determines whether a signal received for a predetermined time period exists based on the controlled sensing reference level. The fast sensing unit 630 may determine whether the received signal exists according to a fast sensing scheme which compares the controlled sensing reference level and power of the received signal.

Also, when it is determined that the received signal exists, the fine sensing unit 640 determines whether the received signal is transmitted from the primary transmitter included in the primary network according to a fine sensing scheme.

As units illustrated in FIG. 6 has been described with reference to FIGS. 1 through 3, a description related thereto will be omitted herein.

Figure 7:
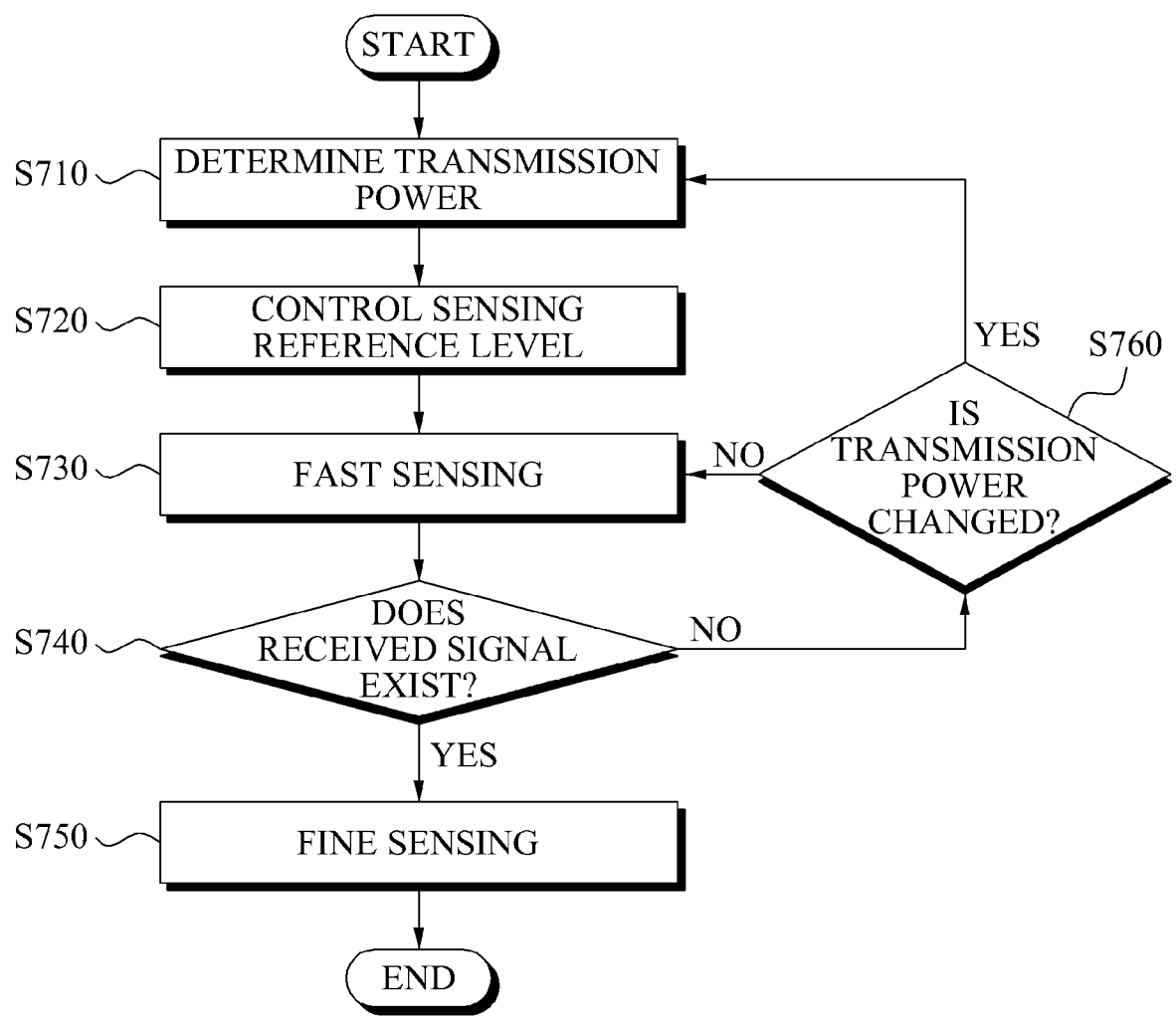
FIG. 7 is a flowchart illustrating a cognitive radio communication method according to an exemplary embodiment.

FIG. 7 is a flowchart illustrating a cognitive radio communication method according to an exemplary embodiment.

Referring to FIG. 7, in operation S710, in the cognitive radio communication method, a cognitive radio communication apparatus determines a transmission power of a secondary transmitter based on a distance between the secondary transmitter and a secondary receiver. The cognitive radio communication apparatus, secondary transmitter, and secondary receiver are included in a secondary network.

In operation S720, in the cognitive radio communication method, the cognitive radio communication apparatus of the secondary network adaptably controls a sensing reference level based on the transmission power of the secondary transmitter of the secondary network.

In operation S730, in the cognitive radio communication method, the cognitive radio communication apparatus of the secondary network performs a fast sensing using the controlled sensing reference level.

In operation S740, in the cognitive radio communication method, the cognitive radio communication apparatus of the secondary network determines whether a signal received during a fast sensing period exists. The fast sensing period is set in advance. When a power of the received signal is greater than or equal to the sensing reference level, it may be determined that the received signal exists. When the power of the received signal is less than the sensing reference level, it may be determined that the received signal does not exist.

In operation S750, in the cognitive radio communication method, the cognitive radio communication apparatus of the secondary network performs a fine sensing, when it is determined that the received signal exists.

In operation S760, in the cognitive radio communication method, when it is determined that the received signal does not exist, the cognitive radio communication apparatus of the secondary network determines whether the transmission power is changed.

In operation S730, in the cognitive radio communication method, when it is determined that the transmission power does not change, the cognitive radio communication apparatus of the secondary network performs the fast sensing again.

In operation S710, in the cognitive radio communication method, when it is determined that the transmission power changes, the cognitive radio communication apparatus of the secondary network determines the transmission power again.

Figure 8:
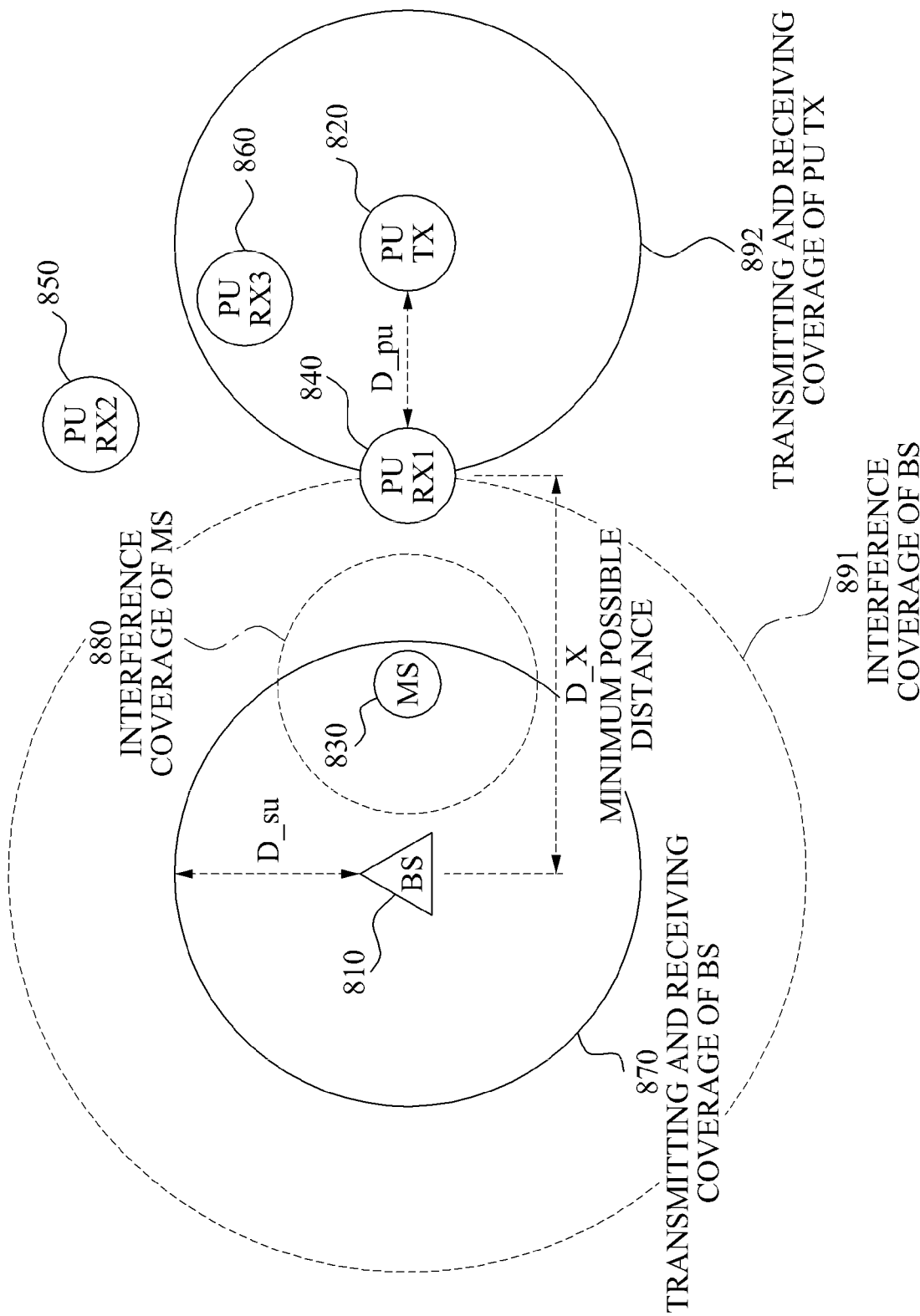
FIG. 8 is a diagram illustrating a cellular communication system and primary network when a secondary network is the cellular communication system and a cellular base station is adjacent to a mobile station according to an exemplary embodiment.

FIG. 8 illustrates a cellular communication system and primary network when a secondary network is the cellular communication system and a cellular base station is adjacent to a mobile station.

Referring to FIG. 8, the cellular communication system, which is the secondary network, includes a base station BS 810 and mobile station MS 830. Also, the primary network includes a primary user transmitter PU TX 820 and primary user receivers PU RX1 840, PU RX2 850, and PU RX3 860.

However, PU TX 820, PU RX1 840, PU RX2 850, and PU RX3 860 do not actually exist. PU TX 820, PU RX1 840, PU RX2 850, and PU RX3 860 are conceptually illustrated in FIG. 8.

BS 810 has a transmitting and receiving coverage 870 where data may be transmitted/received, and has an interference coverage 891 where the interference may affect other communication apparatuses. Also, when uplink communication is performed, MS 830 has an interference coverage 880 where the interference may affect the other communication apparatuses. Also, PU TX 820 has a transmitting and receiving coverage 892 where the data may be transmitted/received.

When BS 810 and MS 830 are adjacent to each other, MS 830 is operated in idle mode in which a communication operation is not performed, or only downlink communication is performed, and BS 810 may control a sensing reference level based on a transmission power of BS 810.

The reason is that the interference coverage 891 of BS 810 includes the interference coverage 880 of MS 830, when BS 810 and MS 830 are adjacent to each other. Also, when MS 830 is operated in idle mode in which the communication operation is not performed, or only downlink communication is performed, MS 830 does not generate interference affecting the other communication apparatuses. Accordingly, BS 810 may control the sensing reference level based on the transmission power of BS 810.

BS 8110 may predict a minimum possible distance D_X using a minimum SINR of each of PU RX1 840, PU RX2 850, and PU RX3 860. Also, BS 810 may assume a virtual PU RX1 840 which is located at the minimum possible distance D_X from BS 810 based on the predicted minimum possible distance D_X.

Accordingly, BS 810 may control the sensing reference level to enable a primary user receiver located within the minimum possible distance D_X to be sensed, and enable a primary user receiver located further than the minimum possible distance D_X to be not sensed.

Specifically, BS 810 assumes a case that PU RX1 840 transmits a signal. In this case, a power of the signal received in BS 810 may be set as the sensing reference level. As setting the sensing reference level has been described with reference to FIG. 5, a description related thereto will be omitted herein.

Figure 9:
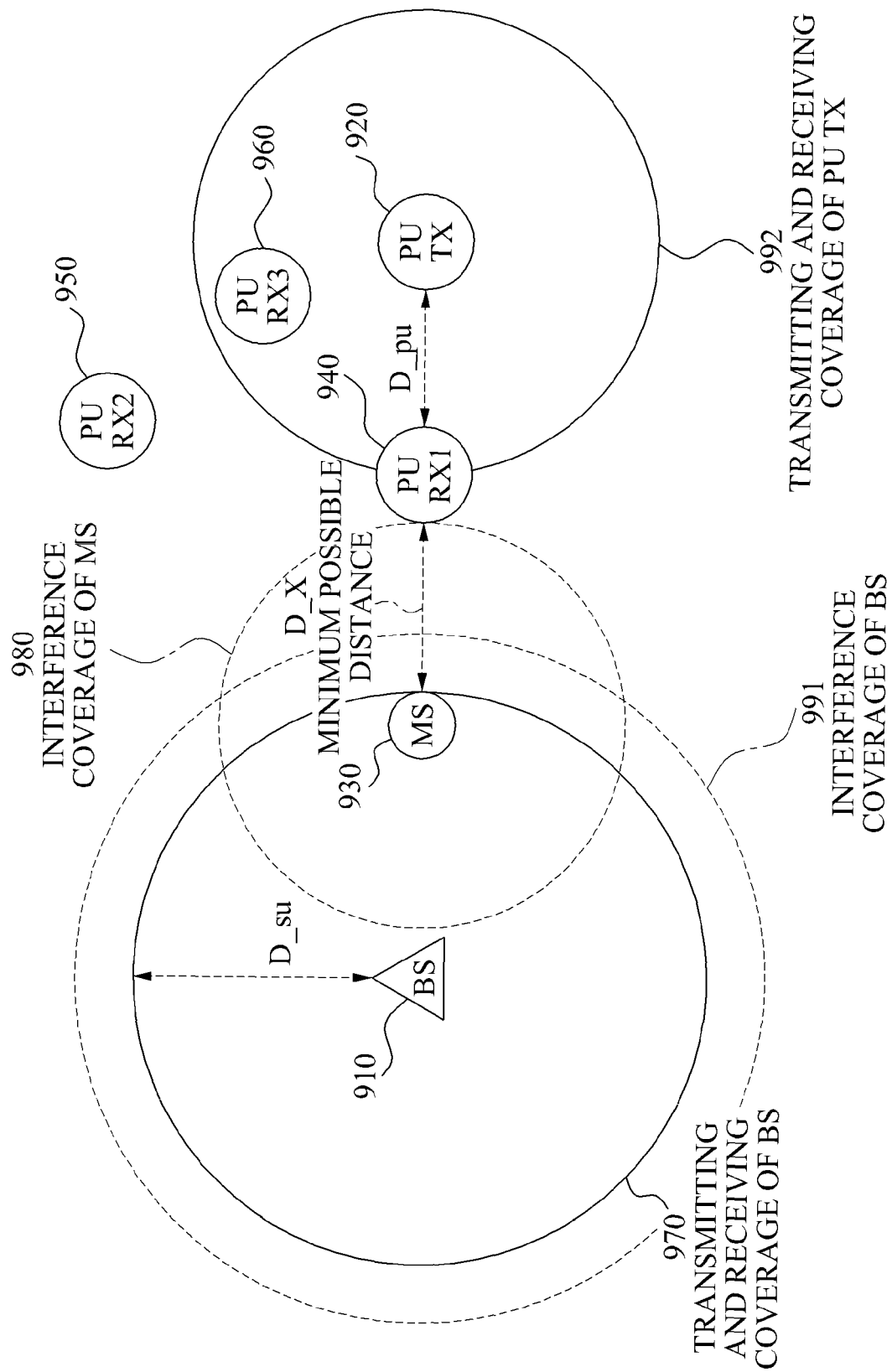
FIG. 9 is a diagram illustrating a cellular communication system and primary network when a secondary network is the cellular communication system and a cellular base station is far from a mobile station according to an exemplary embodiment.

FIG. 9 illustrates a cellular communication system and primary network when a secondary network is the cellular communication system and a cellular base station is far from a mobile station.

Referring to FIG. 9, the cellular communication system, which is the secondary network, includes a base station BS 910 and mobile station MS 930. The primary network includes a primary user transmitter PU TX 920 and primary user receivers PU RX1 940, PU RX2 950, and PU RX3 960.

However, PU TX 920, PU RX1 940, PU RX2 950, and PU RX3 960 do not actually exist. PU TX 920, PU RX1 940, PU RX2 950, and PU RX3 960 are conceptually illustrated in FIG. 9.

BS 910 has a transmitting and receiving coverage 970 where data may be transmitted/received, and an interference coverage 991 where the interference may affect other communication apparatuses. Also, when uplink communication is performed, MS 930 has an interference coverage 980 where the interference may affect the other communication apparatuses. Also, PU TX 920 has a transmitting and receiving coverage 992 where the data may be transmitted/received.

It is assumed that MS 930 performs uplink communication. When the interference coverage 991 of BS 9110 cannot include the interference coverage 980 of MS 930 since BS 910 are far from MS 930, a sensing reference level should be set based on a transmission power of MS 930.

Accordingly, MS 930 may predict a minimum possible distance D_X between MS 930 and PU RX1 940. The minimum possible distance is a distance where an actual SINR of PU RX1 940 is identical to a minimum SINR. PU RX1 940 does not actually exist, that is, PU RX1 940 virtually exists.

BS 910 may set the sensing reference level to enable a primary user receiver located within the minimum possible distance D_X to be sensed. Also, MS 930 may set the sensing reference level to enable a primary user receiver located further than the minimum possible distance D_X to be not sensed.

Accordingly, BS 910 may assume a case that PU RX1 940 located at the minimum possible distance D_X transmits a signal. In this case, a power of the signal received in BS 910 may be set as the sensing reference level. As setting the sensing reference level has been described with reference to FIG. 5, a description related thereto will be omitted herein.

The methods described above including certain cognitive radio communication method may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio communication apparatus, comprising:
    a sensing reference level control unit to adaptably control a sensing reference level based on a transmission power of a secondary transmitter included in a secondary network; and
    a fast sensing unit to determine whether a signal received for a predetermined time period exists based on the controlled sensing reference level.

2. The cognitive radio communication apparatus of claim 1, wherein the sensing reference level control unit predicts an amount of interference which can occur in a primary receiver included in a primary network, and controls the sensing reference level based on the predicted interference amount.

3. The cognitive radio communication apparatus of claim 1, wherein the sensing reference level control unit controls the sensing reference level based on a minimum signal to interference and noise ratio (SINR) required by a primary receiver included in a primary network.

4. The cognitive radio communication apparatus of claim 3, wherein the sensing reference level control unit predicts a minimum possible distance between the secondary transmitter and the primary receiver, and controls the sensing reference level based on the predicted minimum possible distance, the minimum possible distance being a distance where an actual SINR of the primary receiver is identical to the minimum SINR.

5. The cognitive radio communication apparatus of claim 4, wherein the sensing reference level control unit controls the sensing reference level further based on a coverage radius of a primary transmitter included in the primary network.

6. The cognitive radio communication apparatus of claim 1, wherein the sensing reference level control unit controls the reference sensing reference level based on a previously identified power of a signal transmitted from a primary transmitter included in a primary network.

7. The cognitive radio communication apparatus of claim 1, further comprising:
    a fine sensing unit to determine, when it is determined that the received signal exists, whether the received signal is transmitted from a primary transmitter included in a primary network according to a fine sensing scheme.

8. The cognitive radio communication apparatus of claim 1, wherein the fast sensing unit determines whether the received signal exists according to a fast sensing scheme which compares the controlled sensing reference level and power of the received signal.

9. The cognitive radio communication apparatus of claim 1, further comprising:
    a transmission power determination unit to determine the transmission power of the secondary transmitter based on a distance between the secondary transmitter and secondary receiver included in the secondary network.

10. The cognitive radio communication apparatus of claim 9, wherein the transmission power determination unit increases the transmission power of the secondary transmitter when the distance between the secondary transmitter and secondary receiver increases, and decreases the transmission power of the secondary transmitter when the distance between the secondary transmitter and secondary receiver decreases.

11. A cognitive radio communication method, comprising:
    adaptably controlling a sensing reference level based on a transmission power of a secondary transmitter included in a secondary network; and
    determining whether a signal received for a predetermined time period exists based on the controlled sensing reference level.

12. The cognitive radio communication method of claim 11, wherein the controlling predicts an amount of interference which can occur in a primary receiver included in a primary network, and controls the sensing reference level based on the predicted interference amount.

13. The cognitive radio communication method of claim 11, wherein the controlling controls the sensing reference level based on a minimum SINR required by a primary receiver included in a primary network.

14. The cognitive radio communication method of claim 13, wherein the controlling predicts a minimum possible distance between the secondary transmitter and the primary receiver, and controls the sensing reference level based on the predicted minimum possible distance, the minimum possible distance being a distance where an actual SINR of the primary receiver is identical to the minimum SINR.

15. The cognitive radio communication method of claim 11, further comprising:
    determining, when it is determined that the received signal exists, whether the received signal is transmitted from a primary transmitter included in a primary network according to a fine sensing scheme.

16. The cognitive radio communication method of claim 11, further comprising:
    determining the transmission power of the secondary transmitter based on a distance between the secondary transmitter and secondary receiver included in the secondary network.

17. A computer-readable recording medium storing a program for implementing a cognitive radio communication method, comprising:
    adaptably controlling a sensing reference level based on a transmission power of a secondary transmitter included in a secondary network; and
    determining whether a signal received for a predetermined time period exists based on the controlled sensing reference level.

18. A cognitive radio communication apparatus for a cellular communication system, the cognitive radio communication apparatus comprising:
a sensing reference level control unit to adaptably control a sensing reference level based on a transmission power of a base station or terminal included in a secondary network corresponding to the cellular communication system; and
a fast sensing unit to determine whether a signal received for a predetermined time period exists based on the controlled sensing reference level.

19. The cognitive radio communication apparatus for a cellular communication system of claim 18, wherein the sensing reference level control unit predicts an amount of interference which can occur in a primary receiver included in a primary network, and controls the sensing reference level based on the predicted interference amount.

20. The cognitive radio communication apparatus for a cellular communication system of claim 18, wherein the sensing reference level control unit controls the sensing reference level based on a minimum SINR required by a primary receiver included in a primary network.

21. The cognitive radio communication apparatus for a cellular communication system of claim 20, wherein the sensing reference level control unit predicts a minimum possible distance between the primary receiver and any one of the base station and terminal, and controls the sensing reference level based on the predicted minimum possible distance, the minimum possible distance being a distance where an actual SINR of the primary receiver is identical to the minimum SINR.

22. The cognitive radio communication apparatus for a cellular communication system of claim 21, wherein the sensing reference level control unit controls the sensing reference level further based on a coverage radius of a primary transmitter included in the primary network.

23. The cognitive radio communication apparatus for a cellular communication system of claim 18, wherein the sensing reference level control unit controls the reference sensing reference level based on a previously identified power of a signal transmitted from a primary transmitter included in a primary network.

* * * * *